(12) United States Patent
Seo

(10) Patent No.: US 7,733,055 B2
(45) Date of Patent: Jun. 8, 2010

(54) BATTERY PACK AND METHOD OF MANUFACTURING THE SAME

(75) Inventor: Kyungwon Seo, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 462 days.

(21) Appl. No.: 11/638,374

(22) Filed: Dec. 14, 2006

(65) Prior Publication Data
US 2007/0152631 A1 Jul. 5, 2007

(30) Foreign Application Priority Data
Dec. 29, 2005 (KR) .................... 10-2005-0134564

(51) Int. Cl.
 H02J 7/00 (2006.01)
 H01M 2/00 (2006.01)
 H01M 2/08 (2006.01)
(52) U.S. Cl. .................... 320/112; 429/61; 429/180
(58) Field of Classification Search ............... 320/106, 320/107, 112, 114, 113; 429/30, 46, 61, 429/64, 89, 92, 90, 118, 162, 164, 176, 178, 429/180, 181
See application file for complete search history.

(56) References Cited

U.S. PATENT DOCUMENTS

| | | | |
|---|---|---|---|
| 6,137,259 A * | 10/2000 | Hirabayashi et al. | 320/107 |
| 6,337,559 B1 * | 1/2002 | Sato | 320/134 |
| 2004/0167741 A1 * | 8/2004 | Iwaizono | 702/132 |
| 2004/0170887 A1 * | 9/2004 | Masumoto et al. | 429/61 |
| 2005/0084752 A1 * | 4/2005 | Kim | 429/185 |
| 2005/0153195 A1 * | 7/2005 | Han | 429/59 |
| 2006/0019160 A1 * | 1/2006 | Han | 429/185 |
| 2006/0071637 A1 * | 4/2006 | Heo et al. | 320/113 |
| 2006/0083982 A1 * | 4/2006 | Jung et al. | 429/164 |
| 2006/0093896 A1 * | 5/2006 | Hong et al. | 429/61 |
| 2006/0141354 A1 * | 6/2006 | Kwon | 429/164 |

FOREIGN PATENT DOCUMENTS

| | | | |
|---|---|---|---|
| JP | 2000260402 A | * | 9/2000 |
| JP | 2001351954 A | * | 12/2001 |
| KR | 2006-49430 | | 5/2006 |

* cited by examiner

*Primary Examiner*—Edward Tso
*Assistant Examiner*—M'Baye Diao
(74) *Attorney, Agent, or Firm*—Stein McEwen, LLP

(57) ABSTRACT

A battery pack, including a bare cell, a protection circuit board electrically connected to the bare cell, the protection circuit board including a checking unit to check whether the protection circuit board is operational, an upper case disposed on an upper side of the bare cell, the upper case having a checking hole defined therein to check the protection circuit board, the checking hole being formed to be opened to the checking unit, and a water penetration sensor, combined with an exterior of the checking hole, to cover the checking hole.

12 Claims, 4 Drawing Sheets

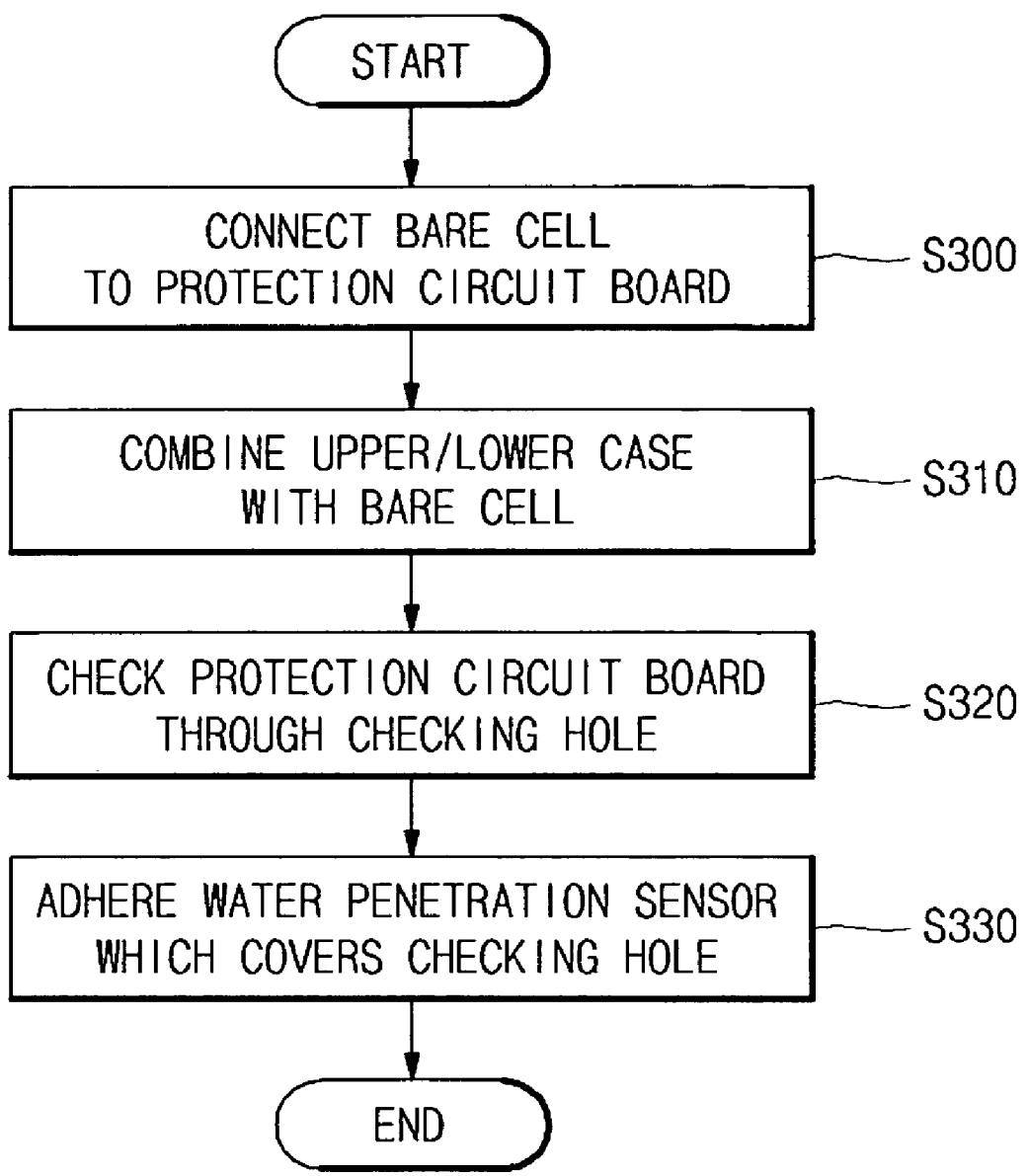

BATTERY PACK AND METHOD OF MANUFACTURING THE SAME

CROSS-REFERENCE TO RELATED PATENT APPLICATION

This application claims the benefit of Korean Patent Application No. 2005-134564, filed Dec. 29, 2005, in the Korean Intellectual Property Office, the disclosure of which is incorporated herein in its entirety by reference.

BACKGROUND OF THE INVENTION

1. Field of the Invention

Aspects of the present invention relate to a battery pack and a method of manufacturing the battery pack, and, more particularly, to a battery pack including a bare cell, a protection circuit module, and a water blocking unit and a method of manufacturing a battery pack including a bare cell, a protection circuit module, and a water blocking unit.

2. Description of the Related Art

Generally, a conventional battery pack includes a bare cell that is capable of charging and discharging as needed, a protection circuit board which controls the charging and discharging and which opens the circuit when over-charging and over-discharging occurs, a resin which fills a space between the bare cell and the protection circuit board so as to prevent the protection circuit board from separating from the bare cell, and a case in which the bare cell, the protection circuit board, and the resin are packed into a form that may be mounted to an external device.

In order to manufacture the conventional battery pack, the positive electrode of the bare cell is connected to the lead, and the negative electrode is connected to the positive temperature coefficient (PTC) thermistor. Then, the lead and the PTC thermistor are electrically connected to the protection circuit board. In order to prevent the protection circuit board from separating from the bare cell, the resin fills the space between the protection circuit board and the bare cell to mechanically fix the protection circuit board to the bare cell. In addition, the battery pack includes a case that enables the battery pack to be mounted to an external device to pack the bare cell and the protection circuit board therein. Here, the case, the bare cell, the protection circuit board, and the resin may be molded into one body using another resin. Alternately, the case may include upper and lower cases and contain the integrated bare cell and protection circuit board when the upper and lower cases are combined.

However, when water penetration sensing paper, which senses whether water has penetrated into the conventional battery pack, is not adhered to the conventional battery pack, water penetration cannot be checked even after water penetrates the battery pack. As a result, the battery pack may be damaged due to the penetrated water, and, accordingly, the performance of the battery pack may deteriorate. Thus, the battery pack penetrated by water cannot efficiently supply power to electronic devices.

SUMMARY OF THE INVENTION

Aspects of the present invention provide a battery pack capable of checking for water penetration to the battery pack and a method of manufacturing a battery pack that is capable of checking whether water penetration to the battery pack is occurring.

According to an aspect of the present invention, there is provided a battery pack, including a bare cell, a protection circuit board electrically connected to the bare cell, the protection circuit board including a checking unit to check whether the protection circuit board is operational, an upper case disposed on an upper side of the bare cell, the upper case having a checking hole defined therein to allow for a checking of the protection circuit board, the checking hole being formed to be opened to the checking unit, and a water penetration sensor, combined with an exterior of the checking hole, to cover the checking hole.

According to this aspect of the present invention, the protection circuit board may be a circuit board on which a protection circuit and a positive temperature coefficient element are connected.

According to this aspect of the present invention, the bare cell includes a case having a positive or negative polarity, an electrode assembly which is contained in the case, and a cap assembly which encloses the case and includes an electrode terminal having a polarity opposite to that of the case.

According to this aspect of the present invention, the electrode terminal may be electrically negative, and the case may have a rectangular shape.

According to another aspect of the present invention, there is provided a method of manufacturing a battery pack, comprising connecting a bare cell to a protection circuit board including a checking unit capable of displaying whether the bare cell is operational, combining an upper side of the bare cell with an upper case, on which a checking hole is formed to be opened to the outside of the upper case, so as to allow for an examination of the checking unit, examining the checking unit through the checking hole to determine whether the protection circuit board is operational, and combining a water penetration unit with the checking hole to cover the checking hole.

According to this aspect of the present invention, the checking unit may check whether the protection circuit board is operational. The checking hole through which the checking unit is connected to the outside of the upper case is formed on the upper case. The water penetration sensor is combined with the checking hole to cover the checking hole after the checking unit checks the protection circuit board.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a flowchart illustrating a method of manufacturing a battery pack according to an embodiment of the present invention.

DETAILED DESCRIPTION OF THE EMBODIMENTS

Figure 1:
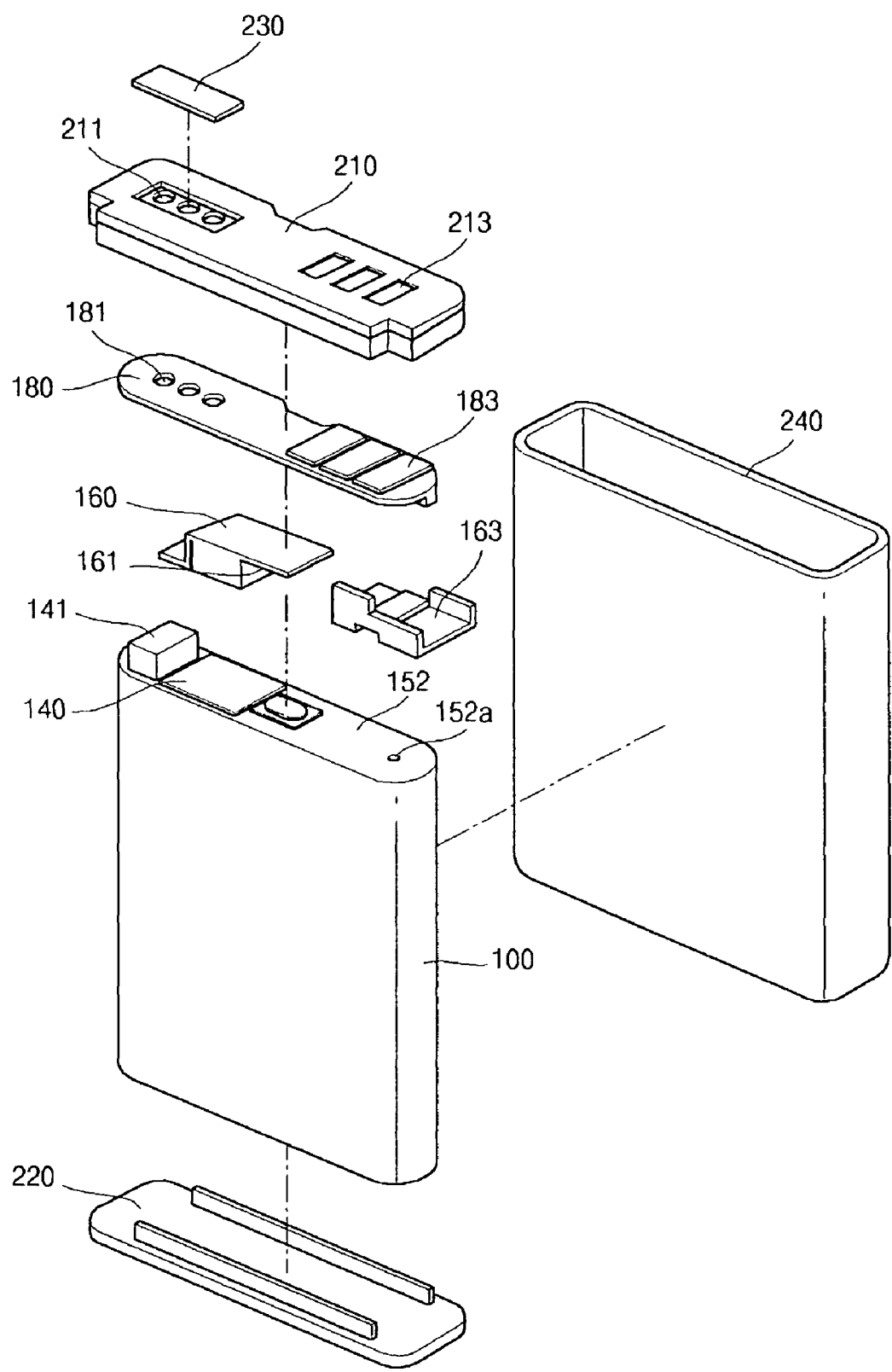
FIG. 1 is an exploded perspective view illustrating a battery pack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
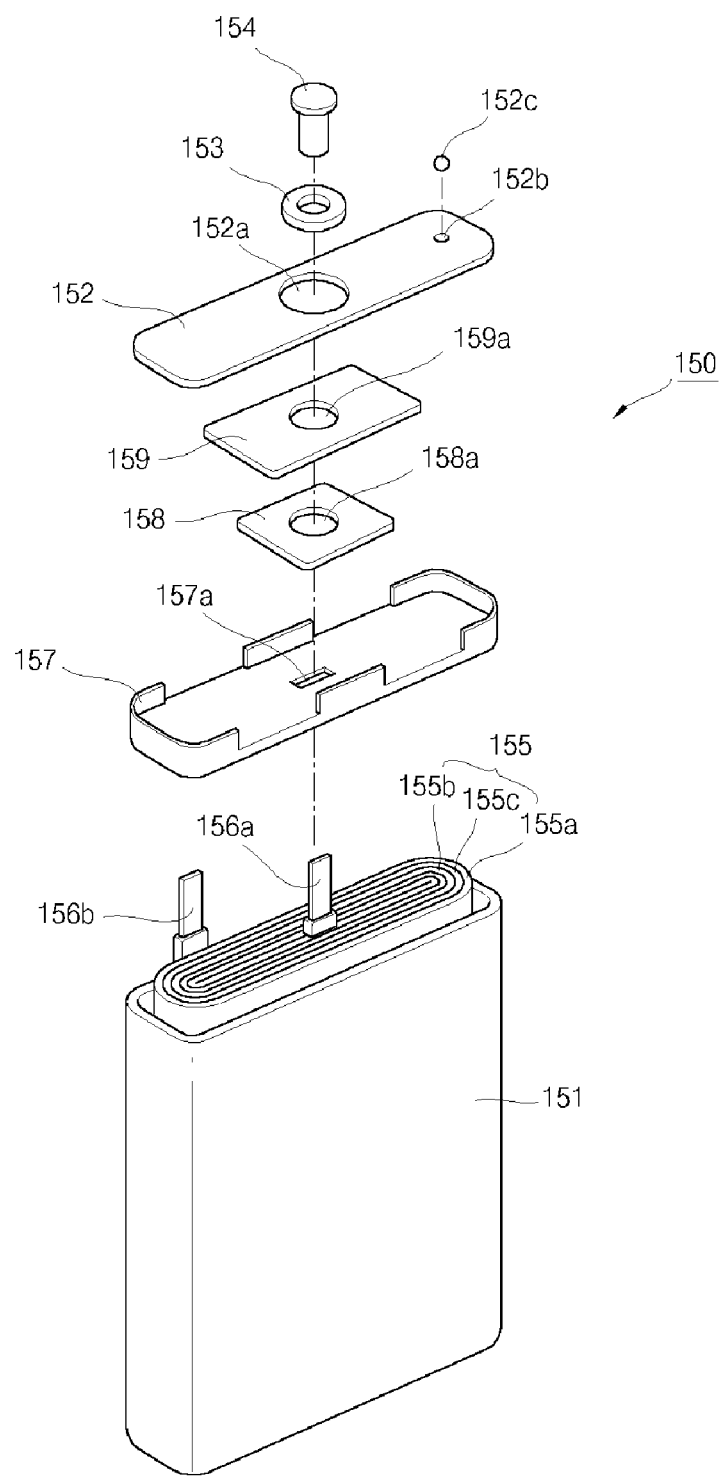
FIG. 2 is an exploded perspective view illustrating a bare cell of the battery pack of FIG. 1.
Figure 3:
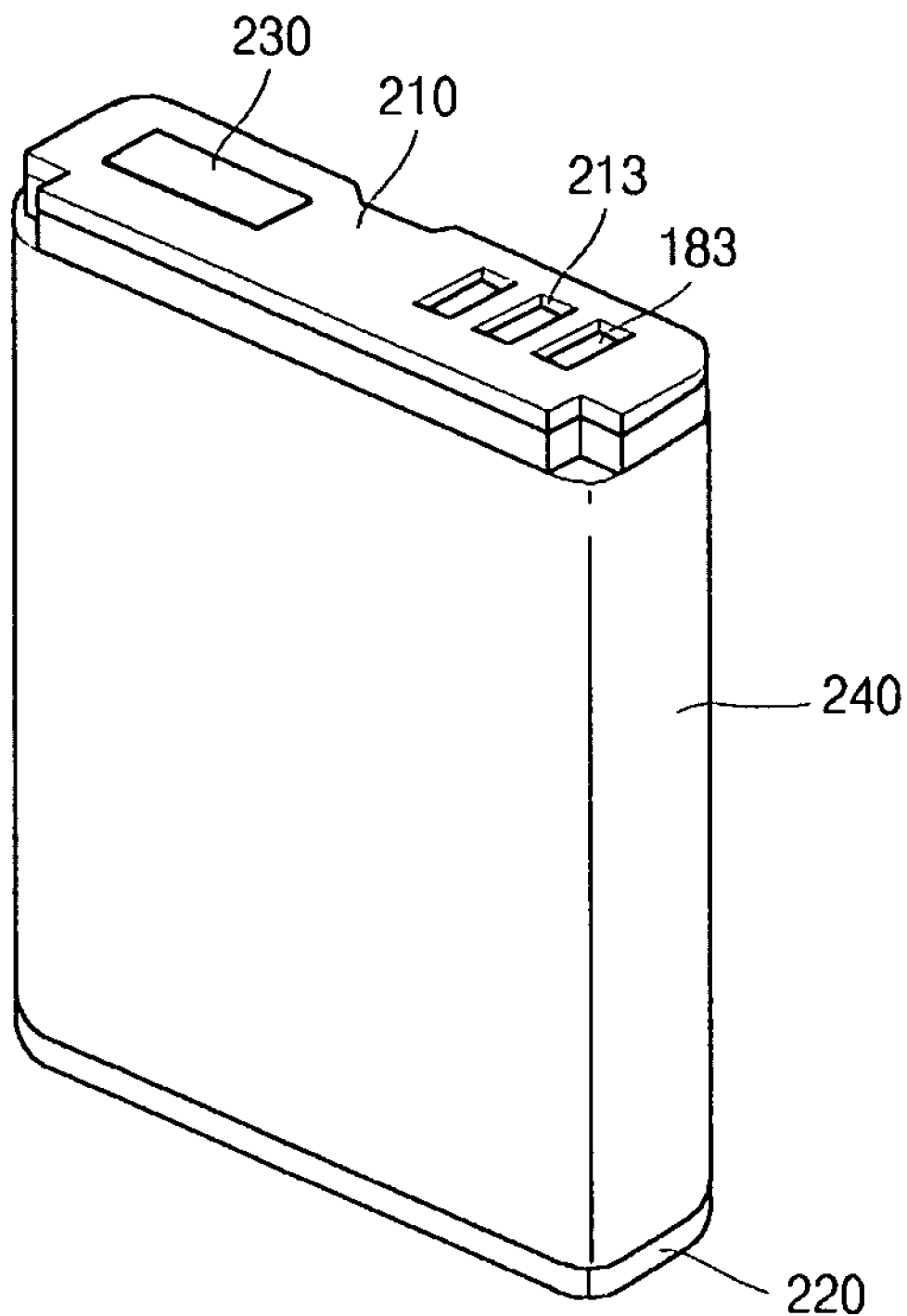
FIG. 3 is a perspective view illustrating the battery pack of FIG. 1 as assembled.

FIG. 1 is an exploded perspective view illustrating a battery pack according to an embodiment of the present invention, and FIG. 2 is an exploded perspective view illustrating a bare cell of the battery pack of FIG. 1. FIG. 3 is a perspective view the battery pack of FIG. 1 as assembled, and FIG. 4 is a flowchart illustrating a method of manufacturing a battery pack according to an embodiment of the present invention.

As shown in FIGS. 1 and 2, the battery pack, according to an embodiment of the present invention, includes a bare cell 100, a protection circuit board 180, which is electrically connected to the bare cell 100, an exterior 240 to enclose the bare cell 100, an upper case 210, which covers the upper side of the bare cell 100, a lower case 220, which covers the lower side of the bare cell 100, and a water penetration sensor 230 located on an outside of the upper case. Here, it is noted that the terms "upper" and "lower" are not intended to limit the scope of the specification or the application and are merely used for convenience of description.

In practice, the bare cell 100 functions as an energy source, which is charged or discharged with a predetermined amount of energy. More specifically, the bare cell 100 includes a case 151 (see FIG. 2), an electrode assembly 155 inserted into the case 151, a cap assembly 150 to cap the case 151, and an electrolyte (not shown) that is injected into the case 151 to allow ions to travel in the electrode assembly 155. Generally, the case 151 has a rectangular, cubic shape, and has a positive or negative polarity.

Typically, the electrode assembly 155 includes a first electrode plate 155a on which a positive activation material (e.g., lithium cobalt oxide ($LiCoO_2$), lithium nickel oxide ($LiNiO_2$), lithium mangan oxide ($LiMn_2O_2$), or the equivalents) is coated, a second electrode plate 155b on which a negative activation material (e.g., graphite or the equivalents) is coated, and a separator 155c interposed between the first electrode plate and the second electrode plate to prevent a short circuit from occurring and to allow only lithium ions to pass therethrough. The separator 155c, being interposed between the first electrode plate 155a and the second electrode plate 155b, the first electrode plate 155a, and the second electrode plate 155b are wound in a jelly roll shape and then inserted into the case 151. Here, first and second electrode taps 156a and 156b are extracted toward an upper direction and are connected to the first and second electrode plates 155a and 155b, respectively. According to an embodiment of the invention, the first electrode plate 155a may be an aluminium (Al) foil, the second electrode plate 155b may be a copper (Cu) foil, and the separator 155c may be made of polyethylene or polypropylene. However, the first and second electrode plates 155a and 155b and the separator 155c are not limited to the aforementioned materials.

The cap assembly 150 is arranged in an upper portion of the case 151. The cap assembly 150 is formed by combining an insulation case 157, a cap plate 152, a terminal plate 158, and an insulation plate 159 on the electrode assembly 155. Through-holes 152a, 157a, 158a, and 159a are defined on the insulation case 157, the cap plate 152, the terminal plate 158, and the insulation plate 159, respectively, and are provided to allow the electrode terminal 154 to pass from an upper portion of the electrode assembly 155 through to the terminal plate.

In addition to the through-hole 152a in the center of the cap plate 152, an electrolyte injection hole 152b may be defined in one side of the cap plate 152. The electrolyte injection hole 152b may be sealed by welding a ball 152c after the electrolyte is injected through the electrolyte injection hole 152b. An insulation gasket 153 may be inserted on the thru-hole 152a of the cap plate 152, and the electrode terminal 154 may be combined with the insulation gasket 153. Further, a reinforcing member 141 is formed on one side of the cap plate 152 to reinforce the resin injected to connect an upper case 210.

According to embodiments of the invention, the case 151 may be electrically positive, and the electrode terminal 154 may be electrically negative.

The electrolyte (not shown) serves as a medium to deliver lithium ions generated by electrochemical reactions in the positive and negative electrodes of the battery while the battery is charged or discharged. The electrolyte may be a non-aquatic organic electrolyte, which is a compound of lithium salt and high-purity organic solvents. Alternatively, the electrolyte may be a polymer electrolyte.

A protection circuit board 180 is electrically connected to the bare cell 100. The protection circuit board 180 includes various protection circuits and a positive temperature coefficient (PTC) element 160 on a printed circuit board (PCB). In addition, a plurality of external terminals 183, which are exposed to an exterior of the bare cell 100, are formed on a surface of the protection circuit board 180. A checking unit 181 is included in the surface of the protection circuit board 180.

It should be noted that an insulation member 140 is interposed between the bare cell 100 and the protection circuit board 180 to provide insulation between the bare cell 100 and the protection circuit board 180. That is, the insulation member 140 is used to prevent a short circuit generated when various electronic components on the protection circuit board 180 come into direct contact with the surface of the bare cell 100.

On the other hand, the exterior 240 has at least one opening and has a size and a shape sufficient to contain the bare cell 100 therein. The bare cell 100, enclosed by the exterior 240, is combined with the upper and lower cases 210 and 220, which cover the upper and lower sides of the bare cell 100.

External electrode holes 213 are formed on a side of the upper case 210 so that the external electrodes 183 formed on the surface of the protection circuit board 180 may be exposed to the outside of the upper case 210. In addition, checking holes 211 to check the protection circuit board 180 are formed in the other side of the upper case 210.

Specifically, the PTC element 160 on the protection circuit board 180 has an infinite electrical resistance when the temperature of the bare cell 100 exceeds a predetermined level. The PTC element 160 is used to control charging and discharging of the bare cell 100 when the bare cell 100 is exposed to a high temperature environment and to prevent a breakdown of the bare cell 100 by opening the protection circuit when the bare cell 100 is excessively charged or discharged. In manufacturing processes of the protection circuit board 180, whether the protection circuit board 180 is defective has to be identified so as to secure the stability and reliability of products. Accordingly, the protection circuit board 180 checks an over-charge blocking voltage, an over-charge recovery voltage, an over-discharge blocking voltage, an over-discharge recovery voltage, and an over-current blocking current of the bare cell 100 through the checking holes 211 formed on the upper case 210.

The protection circuit board 180 is electrically connected to the bare cell 100 through first and second electrode leads 161 and 163. In other words, a first electrode lead 161 may be welded to the cap plate 152 connected to the first electrode tap 156a, and a second electrode lead 162 may be welded to the electrode terminal 154 connected to the second electrode tab 156b. The first electrode lead 161 may be made of aluminum, and the second electrode lead 162 may be made of nickel. However, the first and second electrode leads 161 and 162 are not limited to the aforementioned materials.

Here, it is understood that the first electrode tab 156a is electrically positive, and the second electrode tab 156b is electrically negative. Therefore, when the case 151 and the cap plate 152 are electrically positive, the electrode terminal 154 is electrically negative. On the contrary, when the case 151 and the cap plate 152 are electrically negative, the electrode terminal 154 is electrically positive.

Referring to the water penetration sensor 230, a label in which ink diffuses when the water penetration sensor 230 is exposed to water is generally used. The water penetration sensor 230 is installed on the upper case 210 and is combined with the checking hole 211 that is formed to be opened to the checking unit 181 of the protection circuit, board 180.

Specifically, the water penetration sensor 230 covers the checking hole 211 to prevent impurities from flowing into the protection circuit board 180 through the checking hole 211 after the water penetration sensor 230 checks the protection circuit board 180 through the checking hole 211 of the uppercase 210.

Hereinafter, with reference to FIGS. 1-3 and, particularly, FIG. 4, a method of manufacturing the aforementioned battery pack according to an embodiment of the present invention will be described in detail. First, the bare cell 100 is prepared. The bare cell 100 contains the electrode assembly 155 of which the first and second electrode taps 156a and 156b are extracted. Then, the bare cell 100 is capped with the cap assembly 150 including the cap plate 152 through which the electrode terminal 154 passes, the insulation gasket 153 interposed between the cap plate 152 and the electrode terminal 154, the insulation plate 159, and the terminal plate 158.

The protection circuit board 180, the first and second electrode leads 161 and 163, the PTC element 160, and the insulation member 140 are then combined with the bare cell 100.

At this point, one side of the PTC element is connected to the electrode terminal 154, and the other side of the PTC element is connected to the protection circuit board 180. Next, the insulation member 140 is disposed on the upper side of the bare cell 100, that is, the upper surface of the cap plate 152 to prevent a short circuit from occurring between the protection circuit board 180 and the bare cell 100. Of course, it is understood that the present invention is not limited to the above-mentioned sequences. The protection circuit board 180 is connected to the bare cell 100 via the first and second electrode leads 161 and 163. One side of the first electrode lead 161 is connected to the cap plate 152, and one side of the second electrode lead 163 is connected to the electrode terminal (S300).

Next, the bare cell 100 connected to the protection circuit board 180 is inserted into the exterior 240. Here, at least one opening is formed on one side of the exterior 240.

The upper and lower cases 210 and 220 are then combined with the upper and lower sides of the bare cell 100, respectively (S310). Here, the checking hole 211 of the upper case 210 has to be formed to be opened to the checking unit 181 of the protection circuit board 180.

Thereafter, whether the protection circuit board 180 operates is checked by the checking unit 181 that is exposed through the checking hole 211 (S320). Lastly, the water penetration sensor 230 is combined with the opened checking hole 211, and the battery pack is manufactured (S330).

Accordingly, the battery pack in which the water penetration sensor 230 is combined with the checking hole 211 may determine whether water penetration occurs. In addition, the water penetration sensor 230 may be combined with the checking hole 211 after the assembly of the battery pack and may be simply installed in the conventional battery pack.

As is described above, the battery pack and the method of manufacturing the battery pack according to aspects of the present invention include the water penetration sensor to determine whether water penetrates the battery pack. In addition, the water penetration sensor is combined with the checking hole instead of an additional checking hole cover and formed to be opened upwardly so as to allow for a checking of the protection circuit board in order to prevent the impurities from flowing into the battery pack through the checking hole without additional manufacturing processes.

The water penetration sensor is combined with the checking hole to cover the checking hole, and, accordingly, the water penetration sensor may be mounted to the conventional battery pack.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A battery pack, comprising:
    a bare cell;
    a protection circuit board electrically connected to the bare cell, the protection circuit board including a checking unit to check whether the protection circuit board is operational;
    an upper case disposed on an upper side of the bare cell, the upper case having a checking hole defined therein to allow for a checking of the protection circuit board, the checking hole being formed to expose the checking unit; and
    a water penetration sensor to externally cover the checking hole.

2. The battery pack according to claim 1, wherein the protection circuit board comprises a protection circuit and a positive temperature coefficient element.

3. The battery pack according to claim 1, wherein the bare cell comprises:
    a case having a positive or negative polarity;
    an electrode assembly which is contained in the case; and
    a cap assembly, which encloses the case and which includes an electrode terminal having a polarity opposite to that of the case.

4. The battery pack according to claim 3, wherein the electrode terminal is electrically negative.

5. The battery pack according to claim 3, wherein the case has a rectangular shape.

6. A method of manufacturing a battery pack, comprising:
    connecting a bare cell to a protection circuit board including a checking unit capable of displaying whether the bare cell is operational;
    combining an upper side of the bare cell with an upper case, on which a checking hole is formed to be opened to the outside of the upper case, so as to allow for an examination of the checking unit;
    examining the checking unit through the checking hole to determine whether the protection circuit board is operational; and
    covering, externally, the checking hole with a water penetration unit.

7. A battery pack to encase a bare cell, comprising:
    an upper case, disposed on an upper side of the bare cell, having at least one checking hole defined therein; and a protection circuit board electrically connected to the bare cell to check at least one of an over-charge blocking voltage, an over-charge recovery voltage, an over-discharge blocking voltage, an over-discharge recovery voltage, and/or an over-current blocking current of the bare cell through the at least one checking hole; and a water penetration sensor to externally cover the checking hole.

8. The battery pack according to claim 7, further comprising a lower case to cover a lower side of the bare cell.

9. The battery pack according to claim 7, further comprising a checking unit disposed on a surface of the protection circuit board.

10. The battery pack according to claim 7, wherein the water penetration sensor comprises a label into which ink diffuses when the water penetration sensor is exposed to water.

11. The battery pack according to claim 7, wherein the water penetration sensor is installed on the upper case and is combined with a checking hole that is defined in the protection circuit board.

12. The battery pack according to claim 11, wherein the water penetration sensor covers the checking hole to prevent impurities from flowing into the protection circuit board through the checking hole.

* * * * *